(12) United States Patent
Niitsuma et al.

(10) Patent No.: US 10,231,445 B2
(45) Date of Patent: Mar. 19, 2019

(54) DUAL-BEARING REEL

(71) Applicant: Shimano Inc., Sakai, Osaka (JP)

(72) Inventors: Akira Niitsuma, Sakai (JP); Kunio Takechi, Sakai (JP); Kenji Yoshida, Sakai (JP)

(\*) Notice: Subject to any disclaimer, the term of this patent is extended or adjusted under 35 U.S.C. 154(b) by 183 days.

(21) Appl. No.: 15/606,364

(22) Filed: May 26, 2017

(65) Prior Publication Data
US 2018/0042207 A1 Feb. 15, 2018

(30) Foreign Application Priority Data
Aug. 10, 2016 (JP) .................................. 2016-157547

(51) Int. Cl.
*A01K 89/01* (2006.01)
*A01K 89/015* (2006.01)

(52) U.S. Cl.
CPC ........ *A01K 89/0114* (2013.01); *A01K 89/015* (2013.01); *A01K 89/0113* (2015.05); *A01K 89/0192* (2015.05); *A01K 89/01917* (2015.05); *A01K 89/01* (2013.01)

(58) Field of Classification Search
CPC ............ A01K 89/015; A01K 89/01912; A01K 89/019125; A01K 89/01915; A01K 89/01917
See application file for complete search history.

(56) References Cited

U.S. PATENT DOCUMENTS

| 1,476,769 | A | * | 12/1923 | Schmid | ............ | A01K 89/01917 |
| | | | | | | 242/279 |
| 1,691,622 | A | * | 11/1928 | Adams | ............ | A01K 89/01917 |
| | | | | | | 242/279 |
| 1,964,965 | A | * | 7/1934 | Smelser | ........... | A01K 89/01928 |
| | | | | | | 242/319 |
| 3,061,232 | A | * | 10/1962 | Clark | ................... | A01K 89/052 |
| | | | | | | 242/292 |
| 5,482,220 | A | * | 1/1996 | Hashimoto | ........ | A01K 89/0192 |
| | | | | | | 242/279 |
| 6,053,444 | A | * | 4/2000 | Yamaguchi | ........ | A01K 89/0193 |
| | | | | | | 242/280 |
| 2004/0144877 | A1 | * | 7/2004 | Kawasaki | ........ | A01K 89/01557 |
| | | | | | | 242/278 |

(Continued)

FOREIGN PATENT DOCUMENTS

JP 2013243997 A 12/2013

*Primary Examiner* — Emmanuel M Marcelo
(74) *Attorney, Agent, or Firm* — United IP Counselors, LLC

(57) ABSTRACT

A dual-bearing reel is attachable to a fishing rod and releases a fishing line forward. The dual-bearing reel includes a reel unit, a spool for winding the fishing line, a handle and a level wind mechanism. The spool is rotatably disposed in the reel unit. The handle is rotatably disposed on a lateral part of the reel unit. The level wind mechanism uniformly winds the fishing line onto the spool. The level wind mechanism includes a worm shaft, a guide member and a slide member. The worm shaft includes a helical groove. The guide member is disposed on an outer peripheral side of the worm shaft, and includes an opening and at least one water drain. The opening extends in a lengthwise direction of the worm shaft. The slide member slides along the guide member while engaged with the helical groove.

18 Claims, 5 Drawing Sheets

(56) References Cited

U.S. PATENT DOCUMENTS

| | | | | |
|---|---|---|---|---|
| 2012/0104135 | A1* | 5/2012 | Toma | A01K 89/01912 242/227 |
| 2015/0083840 | A1* | 3/2015 | Kawamata | A01K 89/015 242/250 |
| 2015/0201597 | A1* | 7/2015 | Ikebukuro | A01K 89/01143 242/274 |

* cited by examiner

DUAL-BEARING REEL

CROSS-REFERENCE TO RELATED APPLICATIONS

This application claims priority to Japanese Patent Application No. 2016-157547 filed on Aug. 10, 2016, the entirety of which is hereby incorporated by reference in its entirety.

BACKGROUND

Technical Field

The present disclosure relates to a dual-bearing reel including a level wind mechanism.

Background Art

As described in Japan Laid-open Patent Application Publication No. 2013-243997, a dual-bearing reel includes a level wind mechanism in order to evenly wind a fishing line about a spool. The level wind mechanism includes a worm shaft, a guide member and a slide member. The guide member is disposed on the outer peripheral side of the worm shaft, and the worm shaft extends inside the guide member. The slide member is reciprocated along the guide member in conjunction with rotation of the worm shaft.

The guide member includes an elongated hole extending in the axial direction in order to expose helical grooves of the worm shaft. When intruding into the interior of the guide member through the elongated hole, seawater or so forth is inevitably accumulated in the interior of the guide member. It is concerned that the accumulated water flows along the worm shaft and intrudes into a rotation transmission mechanism inside a reel unit.

BRIEF SUMMARY

It is an object of the present disclosure to inhibit intrusion of seawater or so forth into the interior of the reel unit from the level wind mechanism.

A dual-bearing reel according to an aspect of the present disclosure is attachable to a fishing rod and releases a fishing line forward. The dual-bearing reel includes a reel unit, a spool for winding the fishing line, a handle and a level wind mechanism. The spool is rotatably disposed in the reel unit. The handle is rotatably disposed on a lateral part of the reel unit. The level wind mechanism uniformly winds the fishing line onto the spool. The level wind mechanism includes a worm shaft including a helical groove, a guide member and a slide member. The guide member is disposed on an outer peripheral side of the worm shaft, and includes an opening extending in a lengthwise direction of the worm shaft and at least one water drain. The slide member slides along the guide member while engaged with the helical groove.

In the present dual-bearing reel, the guide member of the level wind mechanism includes at least one water drain. Therefore, even when seawater or so forth (hereinafter simply referred to as "water") intrudes into the guide member through the opening, the water can be discharged to the outside through the at least one water drain. Due to this, it is possible to inhibit intrusion of water into the interior of the reel unit from the level wind mechanism.

The opening can be opened in a release direction of the fishing line when the reel unit is attached to the fishing rod.

The at least one water drain can be provided in a position opposed to the opening. In this case, when the fishing rod is propped up against an object while attached to the reel unit, the at least one water drain faces downward. Therefore, even when water intrudes into the guide member through the opening, the water can be easily discharged outside through the at least one water drain in the propped state of the fishing rod.

The at least one water drain can be provided at least in a position adjacent to the handle. In this case, it is possible to inhibit a situation that water flows on the worm shaft and intrudes into a rotation transmission mechanism and so forth inside the reel unit.

The number of the at least one water drain can be plural. In this case, water can be more easily discharged outside through the water drains.

The at least one water drain can extend in the lengthwise direction of the worm shaft.

Overall, according to the present disclosure, it is possible to inhibit intrusion of water into the interior of the reel unit from the level wind mechanism.

BRIEF DESCRIPTION OF THE DRAWINGS

Referring now to the attached drawings which form a part of this original disclosure.

DETAILED DESCRIPTION OF EMBODIMENTS

Figure 1:
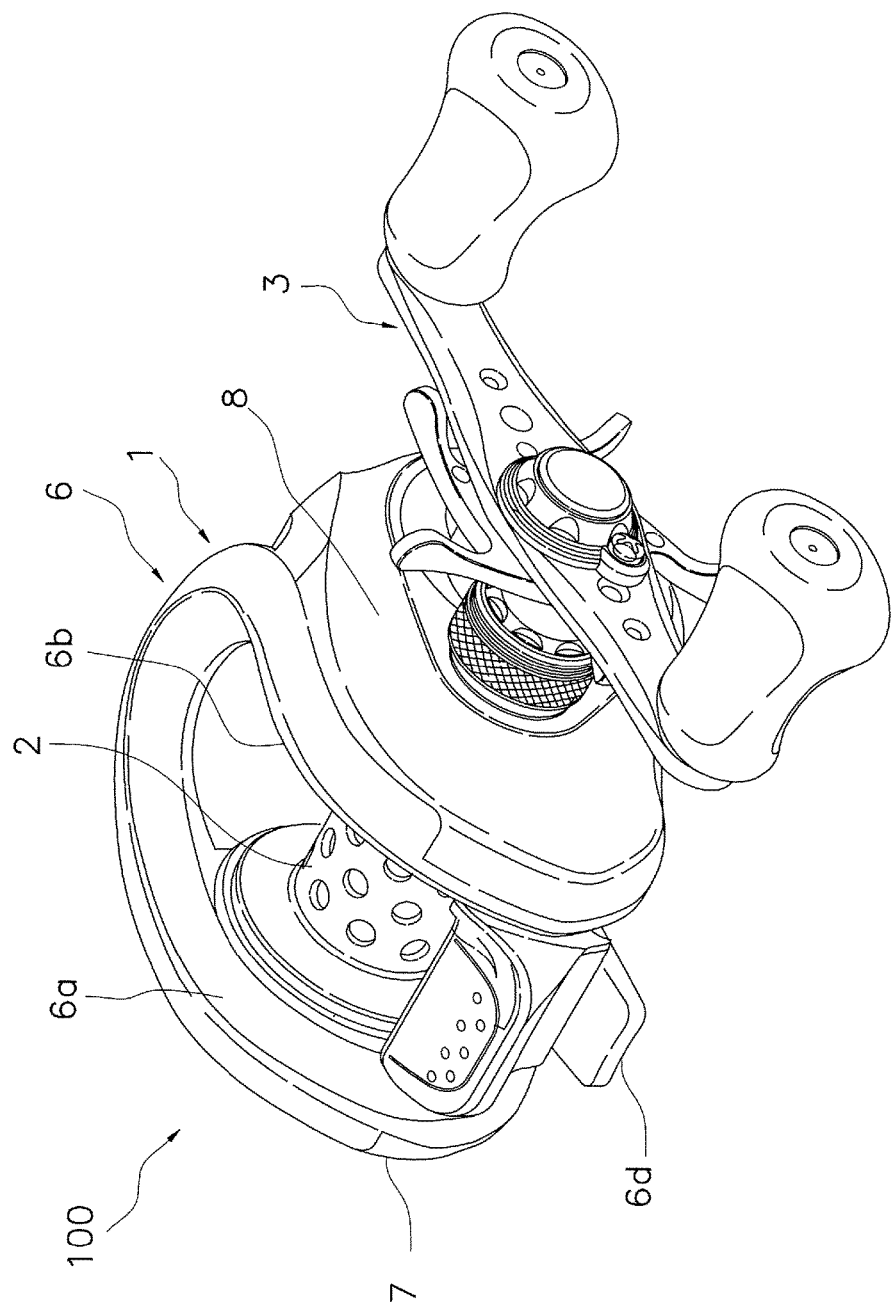
FIG. 1 is a perspective view of a dual-bearing reel.
Figure 2:
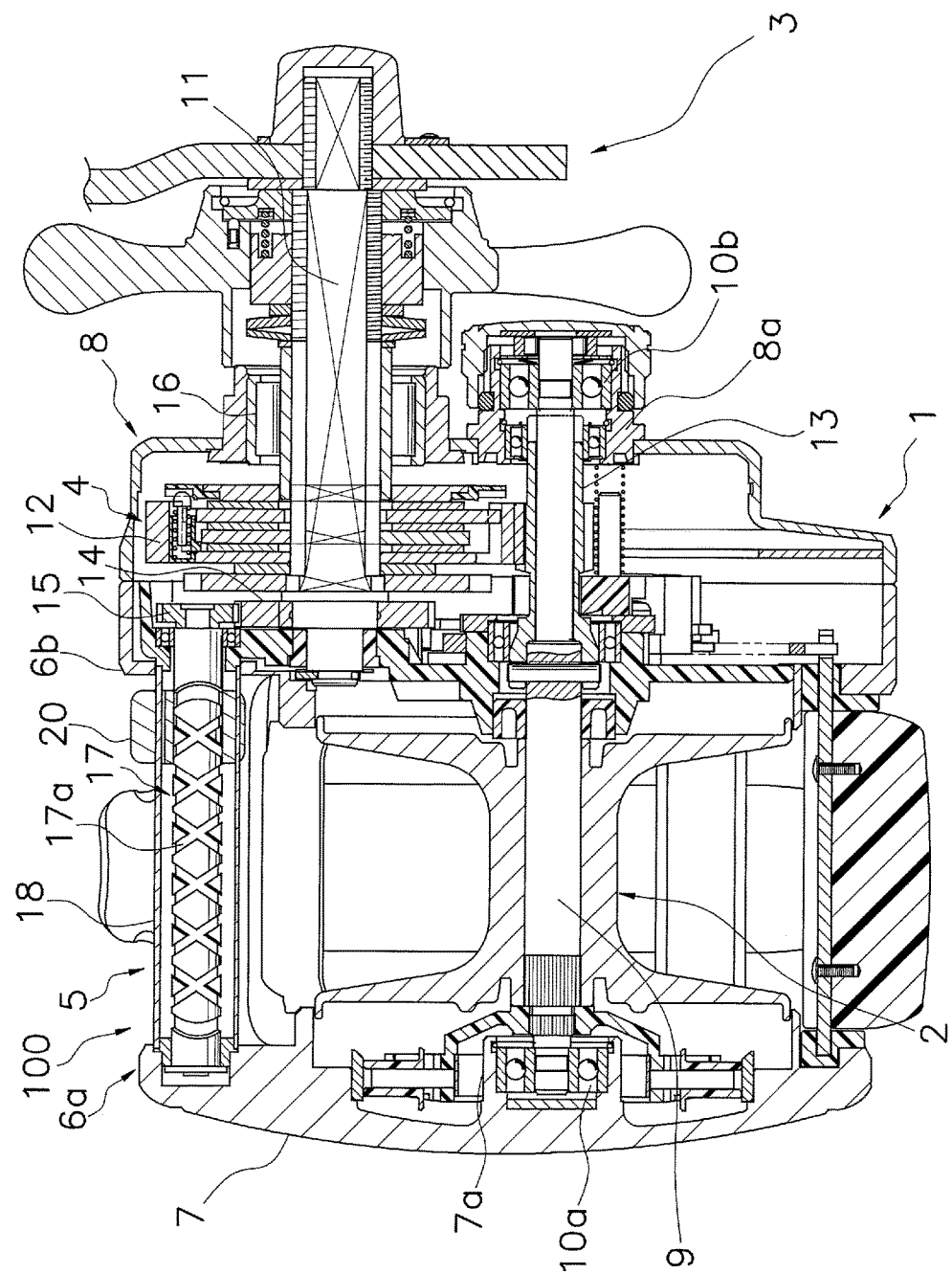
FIG. 2 is a cross-sectional view of the dual-bearing reel.

FIGS. 1 and 2 are a perspective view and a cross-sectional view of a dual-bearing reel 100 employing a preferred embodiment of the present disclosure. The dual-bearing reel 100 includes a reel unit 1, a spool 2, a handle 3, a rotation transmission mechanism 4 and a level wind mechanism 5.

The reel unit 1 includes a frame 6, a first side cover 7, a second side cover 8 and a front cover (not shown in the drawings). The first and second side covers 7 and 8 are attached to the frame 6 so as to cover both sides of the frame 6. The front cover is attached to the front side of the frame 6.

Figure 3:
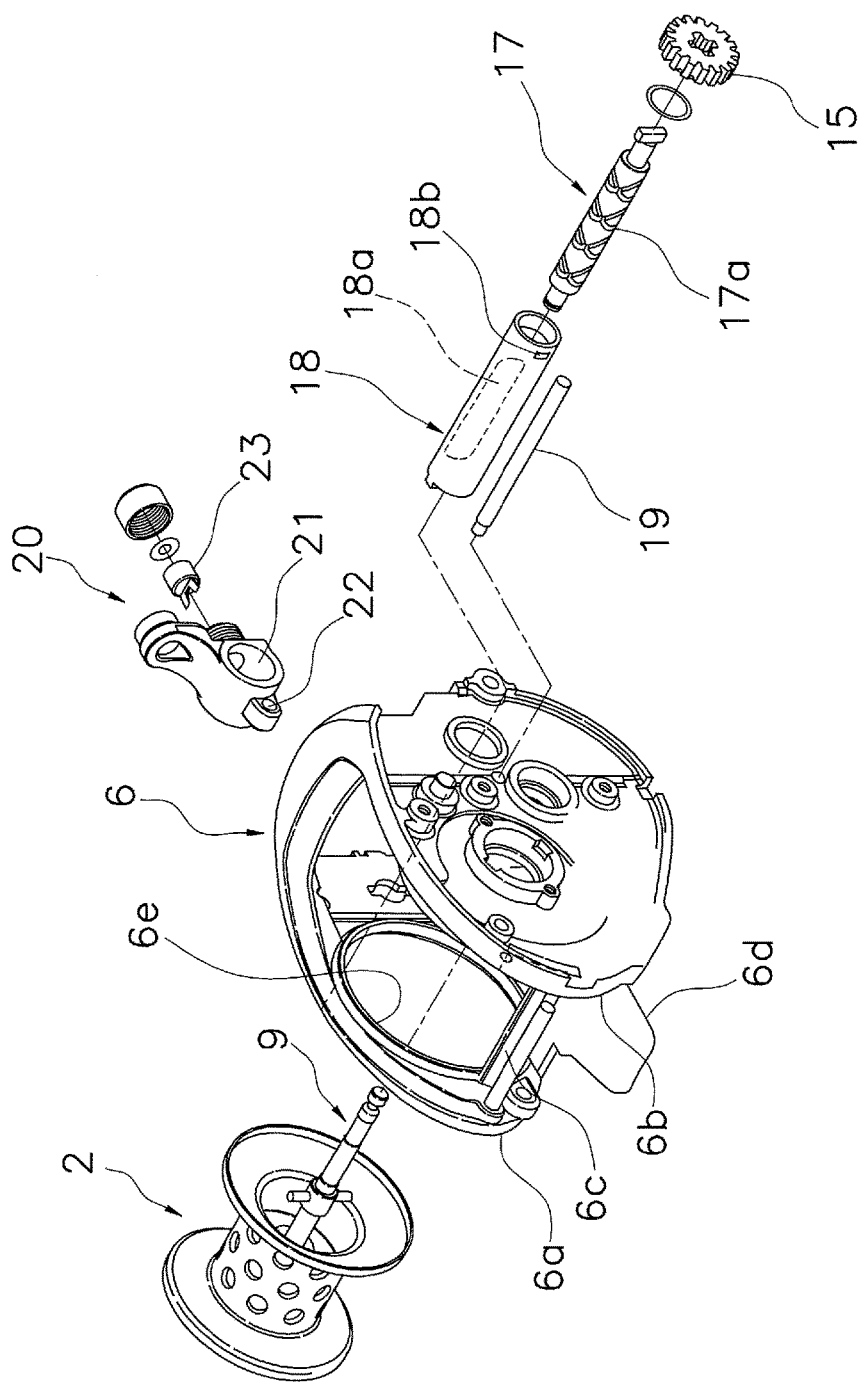
FIG. 3 is an exploded perspective view of a level wind mechanism.

As shown in FIG. 3, the frame 6 includes a first side plate 6a, a second side plate 6b, a plurality of coupling portions 6c and an attachment portion 6d. The first and second side plates 6a and 6b are disposed in opposition to each other at a predetermined interval. The coupling portions 6c couple the first side plate 6a and the second side plate 6b.

The first side plate 6a is an approximately plate-shaped member including an opening 6e. The opening 6e is a circular opening through which the spool 2 is taken out. The rotation transmission mechanism 4 (see FIG. 2) is supported by the second side plate 6b. The attachment portion 6d extends in a back-and-forth direction, and a fishing rod is attached to the lower surface side of the attachment portion 6d.

As shown in FIG. 2, the spool 2 is disposed between the first side plate 6a and the second side plate 6b. A fishing line is wound onto the outer peripheral surface of the spool 2. The spool 2 is fixed to a spool shaft 9 penetrating the middle of the spool 2, and is unitarily rotated with the spool shaft 9. Both ends of the spool shaft 9 are rotatably supported by the reel unit 1 through bearings 10a and 10b. The bearing 10a is disposed in a boss 7a of the first side cover 7, whereas the bearing 10b is disposed in a boss 8a of the second side cover 8.

The handle 3 is rotatably attached to a lateral part of the second side cover 8. The spool 2 and the level wind mechanism 5 are driven in response to a rotational operation of the handle 3 through the rotation transmission mechanism 4.

As shown in FIG. 2, the rotation transmission mechanism 4 includes a drive shaft 11, a drive gear 12, a pinion gear 13 having a tubular shape, a first gear 14 and a second gear 15. The rotation transmission mechanism 4 is a mechanism that transmits rotation of the handle 3 to the spool 2 and the level wind mechanism 5. The rotation transmission mechanism 4 is disposed inside the second side cover 8.

The drive shaft 11 is coupled to the handle 3 and is unitarily rotated with the handle 3. It should be noted that the drive shaft 11 is prevented from rotating in a fishing line releasing direction by a one-way clutch 16 disposed on the outer periphery of the drive shaft 11.

The drive gear 12 is attached to the drive shaft 11 and is unitarily rotated with the drive shaft 11.

The pinion gear 13 is meshed with the drive gear 12. The first gear 14 is attached to the drive shaft 11 and is unitarily rotated with the drive shaft 11. The second gear 15 is meshed with the first gear 14.

As shown in FIGS. 2 and 3, the level wind mechanism 5 includes a worm shaft 17, a guide member 18, a guide shaft 19 and a slide member 20. The level wind mechanism 5 is a mechanism that axially reciprocates in order to uniformly wind the fishing line onto the spool 2. The level wind mechanism 5 is disposed between the first side cover 7 and the second side cover 8, and is also disposed in front of the spool 2.

The worm shaft 17 has a columnar shape and includes a helical groove 17a on the outer peripheral surface thereof. The worm shaft 17 extends in parallel to the spool shaft 9. Additionally, the worm shaft 17 extends between the first side cover 7 and the second side cover 8.

A first end of the worm shaft 17 is rotatably supported by the first side cover 7. The first end of the worm shaft 17 can be supported by the first side cover 7 through a bearing member. On the other hand, a second end of the worm shaft 17 is rotatably supported by the second side cover 8. The second end of the worm shaft 17 can be supported by the second side cover 8 through a bearing member.

As shown in FIGS. 2 and 3, the second gear 15 is attached to the second end of the worm shaft 17. The worm shaft 17 is rotated in conjunction with rotation of the handle 3. When described in detail, the second gear 15 is rotated through the drive shaft 11 and the first gear 14 in conjunction with rotation of the handle 3, and thereby, the worm shaft 17 is rotated.

Figure 4:
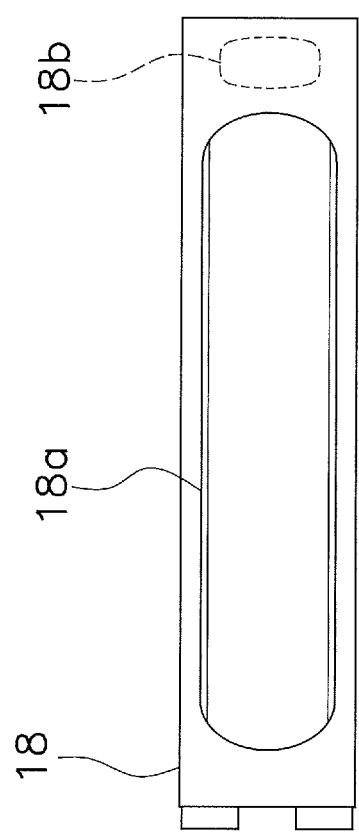
FIG. 4 is a plan view of a guide mechanism when an opening thereof is faced upward.

As shown in FIGS. 3 and 4, the guide member 18 includes an opening 18a and a water drain 18b. The guide member 18 is a member that guides the slide member 20 in a direction along the worm shaft 17. The guide member 18 has a cylindrical shape and is disposed on the outer peripheral side of the worm shaft 17. The guide member 18 extends between the first side cover 7 and the second side cover 8. A first end of the guide member 18 is non-rotatably supported by the first side cover 7. On the other hand, a second end of the guide member 18 is non-rotatably supported by the second side cover 8.

The opening 18a is an elongated hole extending in the lengthwise direction of the worm shaft 17. The opening 18a is opened in a releasing direction of the fishing line when the fishing rod is attached to the reel unit 1. The helical groove 17a of the worm shaft 17 is exposed through the opening 18a.

The water drain 18b is provided in a position opposed to the opening 18a. Detailedly, the water drain downwardly faces to the ground when the fishing rod is propped up against an object while attached to the reel unit 1 (when the fishing rod is placed while the rod tip faces upward). Accordingly, when water intrudes into the guide member 18 through the opening 18a, the water is discharged to the outside through the water drain 18b. Thus, the water drain 18b is an example of a means for discharging water. Additionally, the water drain 18b is provided in the guide member 18 and is located in a position adjacent to the handle 3. Accordingly, it is possible to inhibit a situation that water flows on the worm shaft 17 and intrudes into the rotation transmission mechanism 4 and so forth inside the reel unit 1.

The guide shaft 19 is a member that guides the slide member 20 in a direction along the worm shaft 17, and extends between the first side cover 7 and the second side cover 8.

The slide member 20 reciprocates along the guide member 18 and the guide shaft 19, while sliding against the outer peripheral surface of the guide member 18. Detailedly, the guide member 18 penetrates a first through hole 21 that axially penetrates the middle of the slide member 20. On the other hand, the guide shaft 19 penetrates a second through hole 22 that axially penetrates the slide member 20 and is provided adjacently to the first through hole 21. Additionally, an engaging member 23 to be engaged with the helical groove 17a is attached to the slide member 20. The engaging member 23 is meshed with the helical groove 17a of the worm shaft 17, whereby the slide member 20 reciprocates along the guide member 18 and the guide shaft 19 in synchronization with the handle 3 rotated in the direction that the fishing line is wound onto the spool 2.

<Modification>

Figure 5:
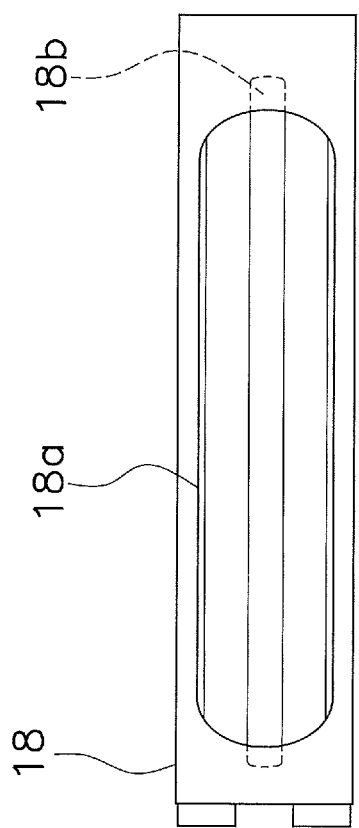
FIG. 5 is a diagram corresponding to FIG. 4 and shows a modification of a water drain.

FIG. 5 shows a modification of the water drain 18b of the aforementioned preferred embodiment. The water drain 18b is an elongated hole extending in the lengthwise direction of the worm shaft 17. The other configurations are similar to those of the aforementioned preferred embodiment, and hence, will not be explained.

Other Preferred Embodiments

One preferred embodiment of the present disclosure has been explained above. However, the present disclosure is not limited to the above, and a variety of changes can be made without departing from the scope of the present disclosure.

(a) The shape of the water drain 18b of the aforementioned preferred embodiment is not limited to a particular shape. The water drain 18b can be a circular hole, a rectangular hole or an elongated hole extending in the circumferential direction. Additionally or alternatively, a plurality of water drains 18b can be provided.

(b) in the aforementioned preferred embodiment, the water drain 18b is provided in the guide member 18 and is located in the position adjacent to the handle 3. However, the configuration of the water drain 18b is not particularly limited to this. The water drains 18b can be provided in both ends of the guide member 18. Alternatively, a plurality of water drains 18b can be provided in arbitrary positions of the guide member 18.

(c) In the aforementioned preferred embodiment, the water drain 18b is provided in the position opposed to the opening 18a. However, the configuration of the water drain 18b is not particularly limited to this. For example, regardless of the position of the opening 18a, the water drain 18b can be provided so as to be located on the rear side of the reel unit 1 (that is opposite to a fishing line releasing direction) when the fishing rod is propped up against an object while attached to the reel unit 1 (when the fishing rod is placed while the rod tip faces upward). Alternatively, a plurality of water drains 18b can be provided in the guide member 18 so as to be located in different positions in the circumferential direction of the guide member 18.

(d) In the aforementioned preferred embodiment, the guide member 18 having a cylindrical shape includes the opening 18a that is an elongated hole extending in the lengthwise direction of the worm shaft 17. However, a guide member having a plate shape can be bent such that the cross-section thereof is made in the shape of a segment of a circle, and the opening of the segment can be configured as the opening 18a. In this case, the worm shaft per se and the guide shaft can guide the slide member, and the guide member can be disposed at an interval from the slide member so as to protect the worm shaft from foreign objects.

(e) In the aforementioned preferred embodiment, when the first and second ends of the worm shaft 17 are supported by the first and second side covers 7 and 8 through the bearing members, the guide member 18 having a cylindrical shape and the bearing members can be integrated by resin, or alternatively, the guide member 18 can be provided with parts that support the bearing members.

What is claimed is:

1. A dual-bearing reel attachable to a fishing rod, the dual-bearing reel for releasing a fishing line forward, the dual-bearing reel comprising:
    a reel unit;
    a spool for winding the fishing line, the spool rotatably disposed in the reel unit;
    a handle rotatably disposed on a lateral part of the reel unit; and
    a level wind mechanism for uniformly winding the fishing line onto the spool, wherein the level wind mechanism includes
        a worm shaft including a helical groove,
        a guide member disposed on an outer peripheral side of the worm shaft, the guide member including an opening and at least one water drain, the opening extending in a lengthwise direction of the worm shaft, and
        a slide member for sliding along the guide member while engaged with the helical groove.

2. The dual-bearing reel according to claim 1, wherein the opening is open in a release direction of the fishing line when the reel unit is attached to the fishing rod.

3. The dual-bearing reel according to claim 2, wherein the at least one water drain is provided in a position opposed to the opening.

4. The dual-bearing reel according to claim 1, wherein the at least one water drain is provided at least in a position adjacent to the handle.

5. The dual-bearing reel according to claim 1, wherein the number of the at least one water drain is plural.

6. The dual-bearing reel according to claim 1, wherein the at least one water drain extends in the lengthwise direction of the worm shaft.

7. The dual-bearing reel according to claim 1, wherein the level wind mechanism axially reciprocates to uniformly wind the fishing line onto the spool, and the length of the opening extends in the lengthwise direction of the worm shaft.

8. A reel unit to release a fishing line forward, the reel unit comprising:
    a spool about which the fishing line is to be wound, the spool to rotate in the reel unit; and
    a level wind mechanism that axially reciprocates to uniformly wind the fishing line onto the spool, wherein the level wind mechanism includes
        a worm shaft including a helical groove,
        a guide member disposed on an outer peripheral side of the worm shaft, the guide member including an opening and at least one water drain, the length of the opening extending in a lengthwise direction of the worm shaft, and
        a slide member to slide along the guide member while engaged with the helical groove.

9. The reel unit according to claim 8, wherein the guide member is disposed in the reel unit such that the opening opens in a release direction of the fishing line.

10. The reel unit according to claim 9, wherein the at least one water drain is provided in a position opposed to the opening.

11. The reel unit according to claim 8, wherein the at least one water drain is provided at least in a lateral part of the guide member.

12. The reel unit according to claim 8, wherein the number of the at least one water drain is plural.

13. The reel unit according to claim 8, wherein the length of the at least one water drain extends in the lengthwise direction of the worm shaft.

14. A reel unit to release a fishing line forward the reel unit comprising:
    a spool about which the fishing line is to be wound, the spool to rotate in the reel unit; and
    a level wind mechanism that axially reciprocates to uniformly wind the fishing line onto the spool, wherein the level wind mechanism includes
        a worm shaft including a helical groove,
        a guide member disposed on an outer peripheral side of the worm shaft, the guide member including an opening and means for discharging water, the length of the opening extending in a lengthwise direction of the worm shaft, and
        a slide member to slide along the guide member while engaged with the helical groove.

15. The reel unit according to claim 14, wherein the guide member is disposed in the reel unit such that the opening opens in a release direction of the fishing line.

16. The reel unit according to claim 15, wherein the means for discharging is provided in a position opposed to the opening.

17. The reel unit according to claim 14, wherein the means for discharging is provided at least in a lateral part of the guide member.

18. The reel unit according to claim 14, wherein the guide member includes plural means for discharging water.

* * * * *